United States Patent
Ma et al.

(10) Patent No.: US 10,936,781 B1
(45) Date of Patent: Mar. 2, 2021

(54) METHOD FOR SETTING PARAMETERS IN DESIGN OF PRINTED CIRCUIT BOARD, DEVICE EMPLOYING METHOD, AND NON-TRANSITORY STORAGE MEDIUM

(71) Applicant: HONGFUJIN PRECISION ELECTRONICS(TIANJIN)CO., LTD., Tianjin (CN)

(72) Inventors: Kuang-Hui Ma, New Taipei (TW); Kai-Hsun Hsueh, New Taipei (TW); Shang-Yi Lin, New Taipei (TW)

(73) Assignee: HONGFUJIN PRECISION ELECTRONICS(TIANJIN)CO., LTD., Tianjin (CN)

( * ) Notice: Subject to any disclaimer, the term of this patent is extended or adjusted under 35 U.S.C. 154(b) by 0 days.

(21) Appl. No.: 16/738,177

(22) Filed: Jan. 9, 2020

(30) Foreign Application Priority Data

Nov. 5, 2019 (CN) .......................... 201911072695.3

(51) Int. Cl.
   *G06F 30/39* (2020.01)
   *G06F 30/27* (2020.01)
   *G06F 30/36* (2020.01)
   *G06F 30/392* (2020.01)
   *G06F 30/367* (2020.01)

(52) U.S. Cl.
   CPC ............ *G06F 30/392* (2020.01); *G06F 30/27* (2020.01); *G06F 30/367* (2020.01)

(58) Field of Classification Search
   CPC ....... G06F 30/367; G06F 30/27; G06F 30/392
   USPC ................................ 716/118, 119, 122, 137
   See application file for complete search history.

(56) References Cited

U.S. PATENT DOCUMENTS

| | | | | |
|---|---|---|---|---|
| 7,174,521 B2 * | 2/2007 | Stine et al. | ............. | H01L 22/34 716/52 |
| 9,158,880 B2 * | 10/2015 | Pan et al. | ................ | G06F 30/39 |
| 2015/0379184 A1 * | 12/2015 | Pan et al. | .............. | G06F 30/394 716/127 |

* cited by examiner

*Primary Examiner* — Sun J Lin
(74) *Attorney, Agent, or Firm* — ScienBiziP, P.C.

(57) ABSTRACT

A method for setting parameters in design of a printed circuit board (PCB) includes obtaining multiple combinations of layout parameters of a PCB and inputting the multiple combinations of layout parameters into a predetermined PCB layout simulation software to obtain multiple interference parameter combinations. The multiple combinations of layout parameters and the multiple interference parameter combinations are defined as training samples, and a predetermined network model is trained through the training samples to obtain a first prediction model. The first prediction model is trained and tested to obtain an impedance prediction model. When the multiple combinations of layout parameters are inputted to the impedance prediction model, only an average predetermined error is allowed between impedance values predicted by the impedance prediction model and impedance values calculated by the predetermined PCB layout simulation software, to enable acceptance of that combination.

20 Claims, 3 Drawing Sheets

METHOD FOR SETTING PARAMETERS IN DESIGN OF PRINTED CIRCUIT BOARD, DEVICE EMPLOYING METHOD, AND NON-TRANSITORY STORAGE MEDIUM

FIELD

The subject matter herein generally relates to printed circuit board (PCB) layout designs.

BACKGROUND

Design engineers need to consider multiple impedance design schemes for designing a PCB layout. For each scheme, the engineers enumerate several layout parameter combinations that have an opportunity to achieve a layout requirement of the PCB. A predetermined PCB layout simulation software is used to verify the schemes. The predetermined PCB layout simulation software can calculate interference parameters corresponding to each scheme, such as the interference parameters comprising impedance, insertion loss, Far-end crosstalk (FEXT), and near-end crosstalk (NEXT). After comprehensively evaluating the schemes, a best layout parameter combination can be determined and applied to the PCB. However, the predetermined PCB layout simulation software may take several minutes to simulate each layout parameter combination, and then it may take several hours to complete a simulation design of the PCB. If a communication product comprises multiple circuit boards, it may take several days to complete the PCB layout design of the product, this means high costs of labor and time.

Thus, there is a room for improvement.

BRIEF DESCRIPTION OF THE DRAWINGS

Implementations of the present disclosure will now be described, by way of embodiments, with reference to the attached figures.

DETAILED DESCRIPTION

Figure 1:
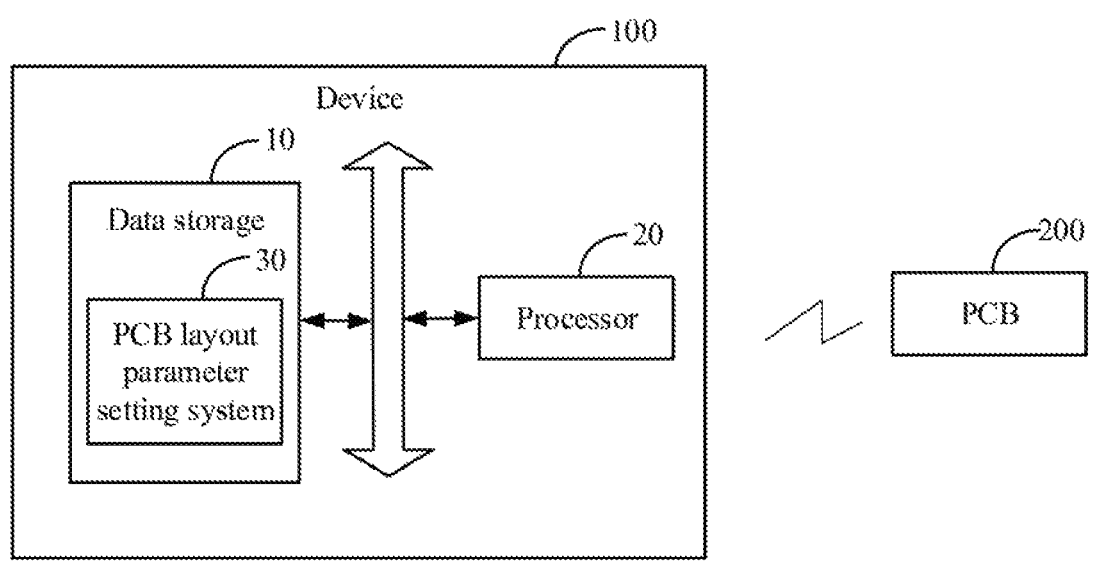
FIG. 1 is a block diagram of an embodiment of a device for setting PCB layout parameters in a design.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a device for setting printed circuit board (PCB) layout parameters in a PCB design (device 100) accordance with an embodiment. The device 100 can establish intelligence models that learn calculation methods of a predetermined PCB layout simulation software to reduce PCB layout time and improve PCB design efficiency.

In one embodiment, the predetermined PCB layout simulation software can be an IMLC software developed by Intel Corporation. Multiple layout parameter combinations are pre-established for a layout design of a PCB 200. The device 100 can select a best layout parameter combination from the multiple layout parameter combinations for the layout design of the PCB 200. In other embodiment, the predetermined PCB layout simulation software can also be other simulation software.

In one embodiment, the device 100 can comprise at least one data storage 10, at least one processor 20, and a PCB layout parameter setting system 30. For example, the device 100 can be a computer or a server. The device 100 can further comprise a display device, a network access device, and communication buses.

Figure 2:
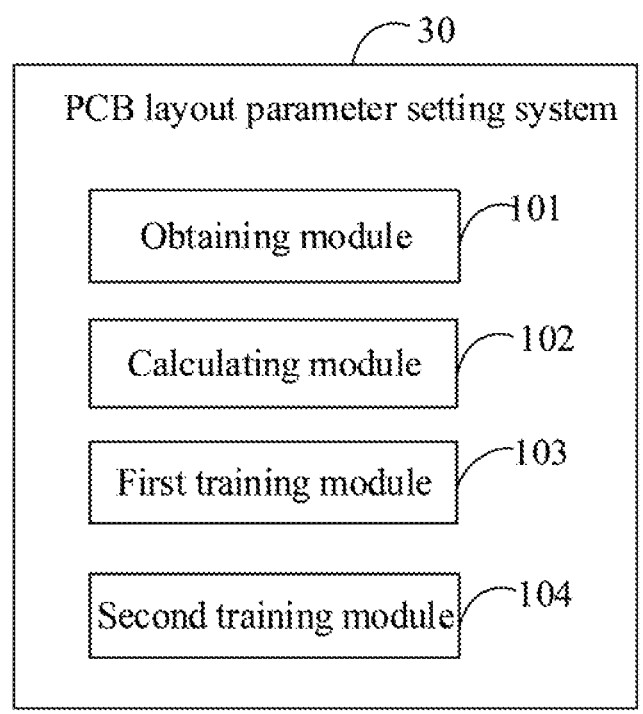
FIG. 2 is a block diagram of an embodiment of a PCB layout parameter setting system of the device of FIG. 0.1.

FIG. 2 illustrates the PCB layout parameter setting system 30 as comprising a plurality of modules, such as an obtaining module 101, a calculating module 102, a first training module 103, and a second training module 104. The modules 101-104 may comprise one or more software programs in the form of computerized codes stored in the data storage 10. The computerized codes may include instructions that can be executed by the processor 20 to provide functions for the modules 101-104.

In one embodiment, the data storage 10 can be in the device 100, or can be a separate external memory card, such as an SM card (Smart Media Card), an SD card (Secure Digital Card), or the like. The data storage 10 can include various types of non-transitory computer-readable storage mediums. For example, the data storage 10 can be an internal storage system, such as a flash memory, a random access memory (RAM) for temporary storage of information, and/or a read-only memory (ROM) for permanent storage of information. The data storage 10 can also be an external storage system, such as a hard disk, a storage card, or a data storage medium. The processor 20 can be a central processing unit (CPU), a microprocessor, or other data processor chip that performs functions of the device 100.

The obtaining module 101 obtains multiple layout parameter combinations in relation to the PCB 200.

In one embodiment, each of the multiple layout parameter combinations can comprises one or more layout parameters. The layout parameters can be or include a parameter that can affect interference parameters of the PCB 200 when made. For example, the layout parameters comprise a line width, a line spacing, an insulation thickness, a copper foil thickness, and a dielectric constant, An interference parameter combination can comprise one or more interference parameters. For example, the interference parameters comprise an impedance parameter, an insertion loss parameter, a far-end crosstalk (FEXT) parameter, and a near-end crosstalk (NEXT) parameter.

In one embodiment, a layout parameter combination library can be pre-established. The library can comprise multiple layout parameter combinations. A method of establishing each of the multiple layout parameter combinations can comprise: determining layout parameters that affect the impedance parameter, the insertion loss parameter, the far-end crosstalk parameter, and the near-end crosstalk parameter; and designing a number of layout parameter combinations based on determined layout parameters and a layout design range to be implemented by a PCB factory. For example, the multiple layout parameter combinations can be designed based on the determined layout parameters and the layout design range through an experimental method. The multiple layout parameter combinations can comprise the same or different layout parameters.

For example, two combinations of the multiple layout parameter combinations can comprise the same layout parameters, but parameter values of the two layout parameter combinations are different. For example, a first layout parameter combination is formed by the line width and the insulation thickness, a second layout parameter combination is formed by the line width, the line spacing, and the insulation thickness. The obtaining module 101 may obtain the multiple layout parameter combinations for performing PCB layout design of the PCB 200 from the layout parameter combination library.

The calculating module 102 inputs the multiple layout parameter combinations to a predetermined PCB layout simulation software to obtain multiple interference parameter combinations.

In one embodiment, each of the multiple interference parameter combinations corresponds to each of the multiple layout parameter combinations. Each of the multiple interference parameter combinations can comprise one or more interference parameters, and each of the multiple interference parameter combinations comprises the impedance parameter.

In one embodiment, when the multiple layout parameter combinations are inputted to the predetermined PCB layout simulation software, the predetermined PCB layout simulation software can output corresponding interference parameter combinations.

The first training module 103 defines the multiple layout parameter combinations and the multiple interference parameter combinations as training samples, and trains a predetermined network model through the training samples to obtain a first prediction model.

In one embodiment, the multiple layout parameter combinations and the multiple interference parameter combinations can form a sample library, the sample library can comprise multiple training samples. Each of the multiple training samples can comprise a layout parameter combination and an interference parameter combination corresponding to the layout parameter combination. The first training module 103 can randomly divide the multiple training samples into a training set and a test set. An amount of data of the training set is greater than an amount of data of the test set. For example, eighty percent of the multiple training samples are in the training set, and twenty percent of the multiple training samples are in the test set. The first training module 103 trains the predetermined network model through the training set to obtain a first intermediate model, and tests the first intermediate model through the test set. When a testing of the first intermediate model meets a predetermined standard, the first training module 103 can define the first intermediate model as the first prediction model.

In one embodiment, the predetermined network model can be a machine learning model. For example, the predetermined network model can be a convolutional neural network (CNN) model or a recurrent neural network (RNN) model. When the first intermediate model is trained by the first training module 103 through the training set, each test data of the test set can be inputted to the first intermediate model to obtain a result of testing. The first training module 103 can count a precision rate of the first intermediate model according to testing results of the test set. When the precision rate of the first intermediate model meets the predetermined standard, it indicates that the first intermediate model meets a requirement of model. The first training module 103 can define the first intermediate model as the first prediction model.

In one embodiment, the predetermined standard may be a predetermined threshold. When the precision rate of the first intermediate model is greater than the predetermined threshold, then the first intermediate model meets the requirement of model.

For example, the interference parameters comprise the impedance parameter, the insertion loss parameter, the FEXT parameter, and the NEXT parameter. The predetermined threshold is 95%. A test data of the test set is inputted to the first intermediate model to obtain a first impedance parameter, a first insertion loss parameter, a first FEXT parameter, and a first NEXT parameter. When errors between values of the first impedance parameter, the first insertion loss parameter, the first FEXT parameter, and the first NEXT parameter predicted by the first intermediate model and values of a second impedance parameter, a second insertion loss parameter, a second FEXT parameter, and a second NEXT parameter calculated by the predetermined PCB layout simulation software are each less than a predetermined error, the first training module 103 determines that a testing result of the test data is passed. When a passing rate of the test set is greater than 95%, the first intermediate model is deemed able to meet the requirements of model, and the first training module 103 defines the first intermediate model as the first prediction model.

In one embodiment, the predetermined error can be defined according to a practical application. For example, the predetermined error is defined as 10%. When an error value between a value of the first impedance parameter predicted by the first intermediate model and a value of the second impedance parameter is less than 10%, an error value between a value of the first insertion loss parameter predicted by the first intermediate model and a value of the second insertion loss parameter is less than 10%, an error value between a value of the FEXT parameter predicted by the first intermediate model and a value of the second FEXT parameter is less than 10%, and an error value between a value of the first NEXT parameter predicted by the first intermediate model and a value of the second NEXT parameter is less than 10%, the first training module 103 determines the testing result of the test data is passed.

In one embodiment, the test data of the test set can comprise a first layout parameter combination and a first interference parameter combination. The first interference parameter combination comprises the second impedance parameter, the second insertion loss parameter, the second FEXT parameter, and the second NEXT parameter. The first layout parameter combination is inputted to the first intermediate model to obtain the first impedance parameter, the first insertion loss parameter, the first FEXT parameter, and the first NEXT parameter.

When the precision rate of the first intermediate model is less than the predetermined threshold, the first intermediate model is deemed not to meet the requirements of model. The first training module 103 can adjust training parameters of the predetermined network model and retrain adjusted predetermined network model through the training set to obtain a second intermediate model. The first training module 103 further tests the second intermediate model through the test set to obtain a precision rate. When the precision rate of the second intermediate model meets the predetermined standard, the second intermediate model is deemed able to meet the requirement of model. The first training module 103 can define the second intermediate model as the first prediction model. When the precision rate of the second intermediate model still does not meet the predetermined standard, the first training module 103 can perform an adjustment step repeatedly of model parameters until a result of testing of retrained intermediate model meets the predetermined standard.

In one embodiment, the training parameters of the predetermined network model can comprise a total number of layers, a number of neurons in each layer, and a model complexity. For example, the predetermined network model is a neural network model, the adjusting of training parameters can comprise: adjusting the total number of layers of the neural network model and/or a number of neurons in each layer of the neural network model. The predetermined network model is a machine learning model, the adjusting of training parameters can comprise: adjusting the model complexity of the machine learning model.

In one embodiment, the interference parameter combination can comprise multiple interference parameters, when a layout parameter combination is inputted to the first prediction model, the first prediction model can output an interference parameter combination corresponding to the layout parameter combination. In a training process of the first prediction model, in order to set an accuracy of prediction of each of the multiple interference parameters in meeting a test requirement, an error value may be set larger (for example: 10%). When predicted errors of the impedance parameter, the insertion loss parameter, the FEXT parameter, and the NEXT parameter are each within 10%, the first prediction model is defined as usable.

In one embodiment, the first prediction model can be further trained to obtain a best prediction model of each interference parameter, such as the first prediction model being trained to obtain an impedance prediction model of the impedance parameter. The training of the impedance prediction model is as follows.

The second training module 104 trains and tests the first prediction model to obtain the impedance prediction model of the impedance parameter.

In one embodiment, the second training module 104 can train the first prediction model through a part of the training set or the full training set, and test trained first prediction model through a part of the test set or the full test set. If a testing of the trained first prediction model meets a requirement, the trained first prediction model can be defined as the impedance prediction model. When data of the test set is inputted to the impedance prediction model, an average error of values of the impedance parameters predicted by the impedance prediction model and values of the impedance parameters calculated by the predetermined PCB layout simulation software can be less than a first error. The first error is less than the predetermined error. The first error can be set according to a practical application, for example, the first error is defined as 5%.

When the impedance prediction model is trained, the multiple layout parameter combinations can be inputted to the impedance prediction model, the impedance prediction model can output multiple predicted impedances corresponding to the multiple layout parameter combinations. The impedance prediction model has a fast calculation speed, each predicted impedance level can be calculated in about 0.02 seconds. Compared with a calculation speed of the predetermined PCB layout simulation software, this is about 15,000 times faster, which greatly reduces a time of PCB layout design.

In one embodiment, in a similar way, the second training module 104 can further train and test the first prediction model to obtain a second prediction model of the insertion loss parameter. When data of the test set is inputted to the second prediction model, an average error of values of the insertion loss parameters predicted by the second prediction model and values of the insertion loss parameters calculated by the predetermined PCB layout simulation software can be less than 5%.

In one embodiment, in a similar way, the second training module 104 can further train and test the first prediction model to obtain a third prediction model of the FEXT parameter. When data of the test set is inputted to the third prediction model, an average error of values of the FEXT parameters predicted by the third prediction model and values of the FEXT parameters calculated by the predetermined PCB layout simulation software can be less than 5%.

In one embodiment, in a similar way, the second training module 104 can further train and test the first prediction model to obtain a fourth prediction model of the NEXT parameter. When data of the test set is inputted to the fourth prediction model, an average error of values of the NEXT parameters predicted by the fourth prediction model and values of the NEXT parameters calculated by the predetermined PCB layout simulation software can be less than 5%.

In one embodiment, the second training module 104 can further train and test the first prediction model to obtain a fifth prediction model for predicting the insertion loss parameter, the FEXT parameter, and the NEXT parameter. When data of the test set is inputted to the fifth prediction model, average errors between values of the insertion loss parameters, the FEXT parameters, and the NEXT parameters predicted by the fifth prediction model and values of the insertion loss parameters, the FEXT parameters, and the NEXT parameters calculated by the predetermined PCB layout simulation software are each less than an error (for example: 5%).

Figure 3:
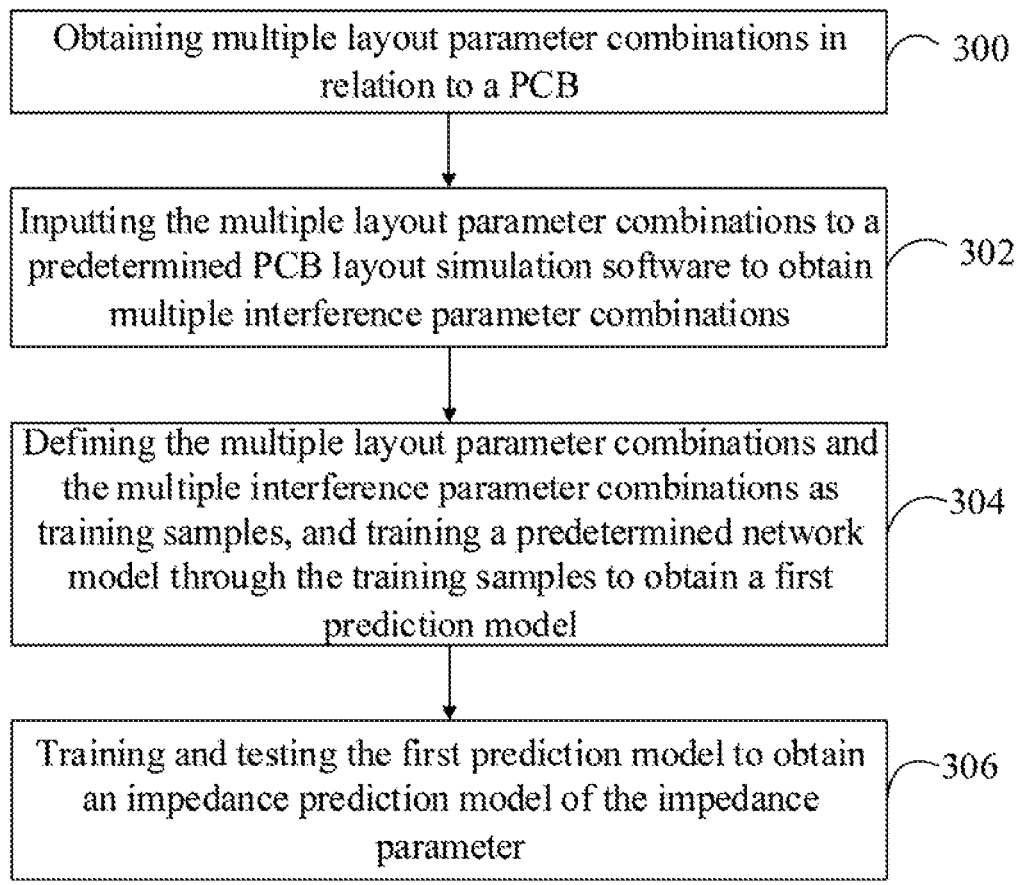
FIG. 3 is flow diagram of an embodiment of a method for setting design parameters in a PCB layout which is utilized in the device of FIG. 0.1.

FIG. 3 illustrates one exemplary embodiment of a method for setting PCB layout parameters in a design for a PCB. The flowchart presents an exemplary embodiment of the method. The exemplary method is provided by way of example, as there are a variety of ways to carry out the method. The method described below can be carried out using the configurations illustrated in FIG. 2, for example, and various elements of these figures are referenced in explaining the example method. Each block shown in FIG. 3 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can begin at block 300.

In block 300, obtaining multiple layout parameter combinations in relation to the PCB 200.

In one embodiment, each of the multiple layout parameter combinations can comprises one or more layout parameters.

The layout parameters can be or include a parameter that can affect interference parameters of the PCB 200 when made. For example, the layout parameters comprise a line width, a line spacing, an insulation thickness, a copper foil thickness, and a dielectric constant, An interference parameter combination can comprise one or more interference parameters. For example, the interference parameters comprise an impedance parameter, an insertion loss parameter, a FEXT parameter, and a NEXT parameter.

In one embodiment, a layout parameter combination library can be pre-established. The library can comprise multiple layout parameter combinations. A method of establishing each of the multiple layout parameter combinations can comprise: determining layout parameters that affect the impedance parameter, the insertion loss parameter, the far-end crosstalk parameter, and the near-end crosstalk parameter; and designing a number of layout parameter combinations based on determined layout parameters and a layout design range to be implemented by a PCB factory. For example, the multiple layout parameter combinations can be designed based on the determined layout parameters and the layout design range through an experimental method. The multiple layout parameter combinations can comprise the same or different layout parameters.

For example, two combinations of the multiple layout parameter combinations can comprise the same layout parameters, but parameter values of the two layout parameter combinations are different. For example, a first layout parameter combination is formed by the line width and the insulation thickness, a second layout parameter combination is formed by the line width, the line spacing, and the insulation thickness. The multiple layout parameter combinations for performing PCB layout design of the PCB 200 can be obtained from the layout parameter combination library.

In block 302, inputting the multiple layout parameter combinations to a predetermined PCB layout simulation software to obtain multiple interference parameter combinations.

In one embodiment, each of the multiple interference parameter combinations corresponds to each of the multiple layout parameter combinations. Each of the multiple interference parameter combinations can comprise one or more interference parameters, and each of the multiple interference parameter combinations comprises the impedance parameter.

In one embodiment, when the multiple layout parameter combinations are inputted to the predetermined PCB layout simulation software, the predetermined PCB layout simulation software can output corresponding interference parameter combinations.

In block 304, defining the multiple layout parameter combinations and the multiple interference parameter combinations as training samples, and training a predetermined network model through the training samples to obtain a first prediction model.

In one embodiment, the multiple layout parameter combinations and the multiple interference parameter combinations can form a sample library, the sample library can comprise multiple training samples. Each of the multiple training samples can comprise a layout parameter combination and an interference parameter combination corresponding to the layout parameter combination. The multiple training samples can be divided into a training set and a test set. An amount of data of the training set is greater than an amount of data of the test set. For example, eighty percent of the multiple training samples are in the training set, and twenty percent of the multiple training samples are in the test set. The predetermined network model can be trained through the training set to obtain a first intermediate model, and tests the first intermediate model through the test set. When a testing of the first intermediate model meets a predetermined standard, the first intermediate model can be defined as the first prediction model.

In one embodiment, the predetermined network model can be a machine learning model. For example, the predetermined network model can be a convolutional neural network (CNN) model or a recurrent neural network (RNN) model. When the first intermediate model is trained through the training set, each test data of the test set can be inputted to the first intermediate model to obtain a result of testing. A precision rate of the first intermediate model can be counted according to testing results of the test set. When the precision rate of the first intermediate model meets the predetermined standard, it indicates that the first intermediate model meets a requirement of model. The first intermediate model can be defined as the first prediction model.

In one embodiment, the predetermined standard may be a predetermined threshold. When the precision rate of the first intermediate model is greater than the predetermined threshold, then the first intermediate model meets the requirement of model.

For example, the interference parameters comprise the impedance parameter, the insertion loss parameter, the FEXT parameter, and the NEXT parameter. The predetermined threshold is 95%. A test data of the test set is inputted to the first intermediate model to obtain a first impedance parameter, a first insertion loss parameter, a first FEXT parameter, and a first NEXT parameter. When errors between values of the first impedance parameter, the first insertion loss parameter, the first FEXT parameter, and the first NEXT parameter predicted by the first intermediate model and values of a second impedance parameter, a second insertion loss parameter, a second FEXT parameter, and a second NEXT parameter calculated by the predetermined PCB layout simulation software are each less than a predetermined error, a testing result of the test data can be determined to be passed. When a passing rate of the test set is greater than 95%, the first intermediate model is deemed able to meet the requirements of model, and the first intermediate model can be defined as the first prediction model.

In one embodiment, the predetermined error can be defined according to a practical application. For example, the predetermined error is defined as 10%. When an error value between a value of the first impedance parameter predicted by the first intermediate model and a value of the second impedance parameter is less than 10%, an error value between a value of the first insertion loss parameter predicted by the first intermediate model and a value of the second insertion loss parameter is less than 10%, an error value between a value of the FEXT parameter predicted by the first intermediate model and a value of the second FEXT parameter is less than 10%, and an error value between a value of the first NEXT parameter predicted by the first intermediate model and a value of the second NEXT parameter is less than 10%, the testing result of the test data can be determined to be passed.

In one embodiment, the test data of the test set can comprise a first layout parameter combination and a first interference parameter combination. The first interference parameter combination comprises the second impedance parameter, the second insertion loss parameter, the second FEXT parameter, and the second NEXT parameter. The first layout parameter combination is inputted to the first intermediate model to obtain the first impedance parameter, the first insertion loss parameter, the first FEXT parameter, and the first NEXT parameter.

When the precision rate of the first intermediate model is less than the predetermined threshold, the first intermediate model is deemed not to meet the requirements of model. Training parameters of the predetermined network model can be adjusted and the adjusted predetermined network model can be retrained through the training set to obtain a second intermediate model. The second intermediate model can be tested through the test set to obtain a precision rate. When the precision rate of the second intermediate model meets the predetermined standard, the second intermediate model is deemed able to meet the requirement of model. The second intermediate model can be defined as the first prediction model. When the precision rate of the second intermediate model still does not meet the predetermined standard, an adjustment step repeatedly of model parameters can be performed until a result of testing of retrained intermediate model meets the predetermined standard.

In one embodiment, the training parameters of the predetermined network model can comprise a total number of layers, a number of neurons in each layer, and a model complexity. For example, the predetermined network model is a neural network model, the adjusting of training parameters can comprise: adjusting the total number of layers of the neural network model and/or a number of neurons in each layer of the neural network model. The predetermined network model is a machine learning model, the adjusting of training parameters can comprise: adjusting the model complexity of the machine learning model.

In one embodiment, the interference parameter combination can comprise multiple interference parameters, when a layout parameter combination is inputted to the first prediction model, the first prediction model can output an interference parameter combination corresponding to the layout parameter combination. In a training process of the first prediction model, in order to set an accuracy of prediction of each of the multiple interference parameters in meeting a test requirement, an error value may be set larger (for example: 10%). When predicted errors of the impedance parameter, the insertion loss parameter, the FEXT parameter, and the NEXT parameter are each within 10%, the first prediction model is defined as usable.

In one embodiment, the first prediction model can be further trained to obtain a best prediction model of each interference parameter, such as the first prediction model being trained to obtain an impedance prediction model of the impedance parameter. The training of the impedance prediction model is as follows.

In block 306, training and testing the first prediction model to obtain the impedance prediction model of the impedance parameter.

In one embodiment, the first prediction model can be trained through a part of the training set or the full training set, and test trained first prediction model through a part of the test set or the full test set. If a testing of the trained first prediction model meets a requirement, the trained first prediction model can be defined as the impedance prediction model. When data of the test set is inputted to the impedance prediction model, an average error of values of the impedance parameters predicted by the impedance prediction model and values of the impedance parameters calculated by the predetermined PCB layout simulation software can be less than a first error. The first error is less than the predetermined error. The first error can be set according to a practical application, for example, the first error is defined as 5%.

When the impedance prediction model is trained, the multiple layout parameter combinations can be inputted to the impedance prediction model, the impedance prediction model can output multiple predicted impedances corresponding to the multiple layout parameter combinations. The impedance prediction model has a fast calculation speed, each predicted impedance level can be calculated in about 0.02 seconds. Compared with a calculation speed of the predetermined PCB layout simulation software, this is about 15,000 times faster, which greatly reduces a time of PCB layout design.

The embodiments shown and described above are only examples. Many details known in the field are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for setting printed circuit board (PCB) layout parameters, the method comprising:
    obtaining multiple layout parameter combinations in relation to a PCB;
    inputting the multiple layout parameter combinations to a predetermined PCB layout simulation software to obtain multiple interference parameter combinations, wherein each interference parameter combination of the multiple interference parameter combinations corresponds to each layout parameter combination of the multiple layout parameter combinations, and each interference parameter combination of the multiple interference parameter combinations comprises an impedance parameter;
    defining the multiple layout parameter combinations and the multiple interference parameter combinations as training samples, and training a predetermined network model through the training samples to obtain a first prediction model; and
    training and testing the first prediction model to obtain an impedance prediction model of the impedance parameter;
    wherein when the multiple layout parameter combinations are inputted to the impedance prediction model, an average error between impedance values predicted by the impedance prediction model and impedance values calculated by the predetermined PCB layout simulation software is less than a predetermined error.

2. The method of claim 1, wherein each interference parameter combination of the multiple interference parameter combinations further comprises an insertion loss parameter, a far-end crosstalk parameter, and a near-end crosstalk parameter.

3. The method of claim 2, wherein the step of obtaining multiple layout parameter combinations in relation to a PCB comprises:

determining layout parameters that affect the impedance parameter, the insertion loss parameter, the far-end crosstalk parameter, and the near-end crosstalk parameter of the PCB; and obtaining the multiple layout parameter combinations in relation to the PCB based on the determined layout parameters and a layout design range implemented by a PCB factory.

4. The method of claim 2, further comprising:

training and testing the first prediction model to obtain a second prediction model of the insertion loss parameter, wherein when the multiple layout parameter combinations are inputted to the second prediction model, an average error between values of insertion loss predicted by the second prediction model and values of insertion loss calculated by the predetermined PCB layout simulation software is less than the predetermined error;

training and testing the first prediction model to obtain a third prediction model of the far-end crosstalk parameter, wherein when the multiple layout parameter combinations are inputted to the third prediction model, an average error between values of far-end crosstalk predicted by the third prediction model and values of far-end crosstalk calculated by the predetermined PCB layout simulation software is less than the predetermined error; and training and testing the first prediction model to obtain a fourth prediction model of the near-end crosstalk parameter, wherein when the multiple layout parameter combinations are inputted to the fourth prediction model, an average error between values of near-end crosstalk predicted by the fourth prediction model and values of near-end crosstalk calculated by the predetermined PCB layout simulation software is less than the predetermined error.

5. The method of claim 2, further comprising:

training and testing the first prediction model to obtain a fifth prediction model for predicting the insertion loss parameter, the far-end crosstalk parameter, and the near-end crosstalk parameter;

wherein when the multiple layout parameter combinations are inputted to the fifth prediction model, average errors between values of insertion loss, values of far-end crosstalk, and values of near-end crosstalk predicted by the fifth prediction model and values of insertion loss, values of far-end crosstalk, and values of near-end crosstalk calculated by the predetermined PCB layout simulation software are each less than the predetermined error.

6. The method of claim 1, further comprising:

dividing the training samples into a training set and a test set, wherein an amount of data of the training set is greater than an amount of data of the test set;

wherein each training sample of the training samples comprises a layout parameter combination and an interference parameter combination corresponding to the layout parameter combination.

7. The method of claim 6, wherein the step of training a predetermined network model through the training samples to obtain a first prediction model comprises:

training the predetermined network model through the training set to obtain a first intermediate model, testing the first intermediate model through the test set; and defining the first intermediate model as the first prediction model if a testing of the first intermediate model meets a predetermined standard.

8. The method of claim 7, further comprising:

adjusting training parameters of the predetermined network model if the testing of first intermediate model does not meet the predetermined standard;

retraining the predetermined network model with the adjusted training parameters through the training set to obtain a second intermediate model and testing the second intermediate model through the test set; and defining the second intermediate model as the first prediction model if a testing of the second intermediate model meets the predetermined standard.

9. The method of claim 8, wherein the predetermined network model is a neural network model, the step of adjusting training parameters of the predetermined network model comprises:

adjusting a total number of layers of the neural network model and a number of neurons in each layer of the neural network model.

10. A device for setting printed circuit board (PCB) layout parameters, the device comprising:

at least one processor; and a storage device storing one or more programs which, when executed by the at least one processor, cause the at least one processor to:

obtain multiple layout parameter combinations in relation to a PCB;

input the multiple layout parameter combinations to a predetermined PCB layout simulation software to obtain multiple interference parameter combinations, wherein each interference parameter combination of the multiple interference parameter combinations corresponds to each layout parameter combination of the multiple layout parameter combinations, and each interference parameter combination of the multiple interference parameter combinations comprises an impedance parameter;

define the multiple layout parameter combinations and the multiple interference parameter combinations as training samples, and train a predetermined network model through the training samples to obtain a first prediction model; and train and test the first prediction model to obtain an impedance prediction model of the impedance parameter;

wherein when the multiple layout parameter combinations are inputted to the impedance prediction model, an average error between impedance values predicted by the impedance prediction model and impedance values calculated by the predetermined PCB layout simulation software is less than a predetermined error.

11. The device of claim 10, wherein each interference parameter combination of the multiple interference parameter combinations further comprises an insertion loss parameter, a far-end crosstalk parameter, and a near-end crosstalk parameter.

12. The device of claim 11, wherein the at least one processor to obtain multiple layout parameter combinations in relation to a PCB comprises:

determine layout parameters that affect the impedance parameter, the insertion loss parameter, the far-end crosstalk parameter, and the near-end crosstalk parameter of the PCB; and obtain the multiple layout parameter combinations in relation to the PCB based on the determined layout parameters and a layout design range implemented by a PCB factory.

13. The device of claim 11, wherein the at least one processor is further configured to:
train and test the first prediction model to obtain a second prediction model of the insertion loss parameter, wherein when the multiple layout parameter combinations are inputted to the second prediction model, an average error between values of insertion loss predicted by the second prediction model and values of insertion loss calculated by the predetermined PCB layout simulation software is less than the predetermined error;
train and test the first prediction model to obtain a third prediction model of the far-end crosstalk parameter, wherein when the multiple layout parameter combinations are inputted to the third prediction model, an average error between values of far-end crosstalk predicted by the third prediction model and values of far-end crosstalk calculated by the predetermined PCB layout simulation software is less than the predetermined error; and
train and test the first prediction model to obtain a fourth prediction model of the near-end crosstalk parameter, wherein when the multiple layout parameter combinations are inputted to the fourth prediction model, an average error between values of near-end crosstalk predicted by the fourth prediction model and values of near-end crosstalk calculated by the predetermined PCB layout simulation software is less than the predetermined error.

14. The device of claim 11, wherein the at least one processor is further configured to:
train and test the first prediction model to obtain a fifth prediction model for predicting the insertion loss parameter, the far-end crosstalk parameter, and the near-end crosstalk parameter;
wherein when the multiple layout parameter combinations are inputted to the fifth prediction model, average errors between values of insertion loss, values of far-end crosstalk, and values of near-end crosstalk predicted by the fifth prediction model and values of insertion loss, values of far-end crosstalk, and values of near-end crosstalk calculated by the predetermined PCB layout simulation software are each less than the predetermined error.

15. The device of claim 10, wherein the at least one processor is further configured to:
divide the training samples into a training set and a test set, wherein an amount of data of the training set is greater than an amount of data of the test set;
wherein each training sample of the training samples comprises a layout parameter combination and an interference parameter combination corresponding to the layout parameter combination.

16. The device of claim 15, wherein the at least one processor to train a predetermined network model through the training samples to obtain a first prediction model comprises:
train the predetermined network model through the training set to obtain a first intermediate model;
test the first intermediate model through the test set; and
define the first intermediate model as the first prediction model if a testing of the first intermediate model meets a predetermined standard.

17. The device of claim 16, wherein the at least one processor is further configured to:
adjust training parameters of the predetermined network model if the testing of the first intermediate model does not meet the predetermined standard;
retrain the predetermined network model with the adjusted training parameters through the training set to obtain a second intermediate model and test the second intermediate model through the test set; and
define the second intermediate model as the first prediction model if a testing of the second intermediate model meets the predetermined standard.

18. The device of claim 17, wherein the predetermined network model is a neural network model, the at least one processor configured to adjust training parameters of the predetermined network model comprises:
adjust a total number of layers of the neural network model and a number of neurons in each layer of the neural network model.

19. A non-transitory storage medium having stored thereon instructions that, when executed by a processor of a device, cause the device to perform a method for setting printed circuit board (PCB) layout parameters, the method comprising:
obtaining multiple layout parameter combinations in relation to a PCB;
inputting the multiple layout parameter combinations to a predetermined PCB layout simulation software to obtain multiple interference parameter combinations, wherein each interference parameter combination of the multiple interference parameter combinations corresponds to each layout parameter combination of the multiple layout parameter combinations, and each interference parameter combination of the multiple interference parameter combinations comprises an impedance parameter;
defining the multiple layout parameter combinations and the multiple interference parameter combinations as training samples, and training a predetermined network model through the training samples to obtain a first prediction model; and
training and testing the first prediction model to obtain an impedance prediction model of the impedance parameter;
wherein when the multiple layout parameter combinations are inputted to the impedance prediction model, an average error between impedance values predicted by the impedance prediction model and impedance values calculated by the predetermined PCB layout simulation software is less than a predetermined error.

20. The non-transitory storage medium of claim 19, wherein each interference parameter combination of the multiple interference parameter combinations further comprises an insertion loss parameter, a far-end crosstalk parameter, and a near-end crosstalk parameter.

* * * * *